US009514701B2

(12) United States Patent
Pyun et al.

(10) Patent No.: US 9,514,701 B2
(45) Date of Patent: Dec. 6, 2016

(54) METHOD OF OUTPUTTING COMMON VOLTAGES TO A DISPLAY PANEL, DISPLAY PANEL DRIVING APPARATUS FOR PERFORMING THE METHOD AND DISPLAY APPARATUS INCLUDING THE DISPLAY PANEL DRIVING APPARATUS

(71) Applicant: Samsung Display Co., Ltd., Yongin, Gyeonggi-Do (KR)

(72) Inventors: Ki-Hyun Pyun, Goyang-si (KR); Tong-Ill Kwak, Cheonan-si (KR); Jong-Hyun Lee, Seoul (KR); Woon-Yong Lim, Busan (KR); Eui-Myeong Cho, Anyang-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 264 days.

(21) Appl. No.: 14/154,693

(22) Filed: Jan. 14, 2014

(65) Prior Publication Data

US 2015/0015561 A1 Jan. 15, 2015

(30) Foreign Application Priority Data

Jul. 9, 2013 (KR) ........................ 10-2013-0080094

(51) Int. Cl.
*G06F 3/038* (2013.01)
*G09G 5/00* (2006.01)
*G09G 3/36* (2006.01)

(52) U.S. Cl.
CPC .......... *G09G 3/3696* (2013.01); *G09G 3/3655* (2013.01); *G09G 2320/0219* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 7,893,907 | B2 | 2/2011 | Kang | |
| 8,299,995 | B2 | 10/2012 | Jeong et al. | |
| 2003/0058703 | A1* | 3/2003 | Kiehl | G11C 16/22 365/200 |
| 2006/0044249 | A1* | 3/2006 | Lee | G09G 3/3611 345/98 |
| 2007/0097757 | A1* | 5/2007 | Ha | G09G 3/3655 365/189.09 |
| 2007/0146260 | A1* | 6/2007 | Kang | G09G 3/3655 345/87 |
| 2011/0175876 | A1* | 7/2011 | Chang | G09G 3/3655 345/211 |

FOREIGN PATENT DOCUMENTS

| | | | |
|---|---|---|---|
| KR | 1020020009740 | * | 2/2002 |
| KR | 1020020009740 | A | 2/2002 |
| KR | 1020040061505 | * | 7/2004 |
| KR | 1020040077188 | A | 9/2004 |
| KR | 1020060007210 | A | 1/2006 |
| KR | 1020070072762 | A | 7/2007 |
| KR | 1020080001855 | * | 1/2008 |
| KR | 1020080001855 | A | 1/2008 |
| KR | 1020080028564 | A | 4/2008 |
| KR | 1020080051238 | A | 6/2008 |
| KR | 1020080064524 | A | 7/2008 |
| KR | 1020090123163 | * | 12/2009 |

* cited by examiner

*Primary Examiner* — Ilana Spar
*Assistant Examiner* — Kirk Hermann
(74) *Attorney, Agent, or Firm* — Cantor Colburn LLP

(57) ABSTRACT

A method of driving a display panel includes: selectively providing a resistance using resistor parts in response to address signals, where the resistor parts have resistances, respectively; and outputting common voltages to the display panel based on the selectively provided resistance.

17 Claims, 5 Drawing Sheets

METHOD OF OUTPUTTING COMMON VOLTAGES TO A DISPLAY PANEL, DISPLAY PANEL DRIVING APPARATUS FOR PERFORMING THE METHOD AND DISPLAY APPARATUS INCLUDING THE DISPLAY PANEL DRIVING APPARATUS

This application claims priority to Korean Patent Application No. 10-2013-0080094, filed on Jul. 9, 2013, and all the benefits accruing therefrom under 35 U.S.C. §119, the content of which in its entirety is herein incorporated by reference.

BACKGROUND

1. Field

Exemplary embodiments of the invention relate to a method of driving a display panel, a display panel driving apparatus performing the method and a display apparatus including the display panel driving apparatus. More particularly, exemplary embodiments of the invention relate to a method of driving a display panel, in which a plurality of common voltages are applied to the display panel, a display panel driving apparatus performing the method and a display apparatus including the display panel driving apparatus.

2. Description of the Related Art

A liquid crystal display apparatus typically includes a pixel electrode, a common electrode and a liquid crystal layer disposed between the pixel electrode and the common electrode and including a liquid crystal. In such a liquid crystal display apparatus, a pixel voltage is applied to the pixel electrode, a common voltage is applied to the common electrode, and an alignment of the liquid crystal in the liquid crystal layer is changed due to an electric field generated by the pixel voltage and the common voltage.

In a display apparatus including a large-sized display panel, the common voltage may be differently applied to the large-sized display panel according to a position of the display panel, due to distribution of a kick-back voltage according to the position of the display panel.

In a conventional liquid crystal display apparatus, a resistance of a resistor may be changed to provide and control a plurality of common voltages according to the position of the display panel.

SUMMARY

Exemplary embodiments of the invention provide a method of driving a display panel for providing and changing a plurality of common voltages.

Exemplary embodiments of the invention also provide a display panel driving apparatus performing the above-mentioned method.

Exemplary embodiments of the invention also provide a display apparatus including the above-mentioned display panel driving apparatus.

According to an exemplary embodiment of the invention, a method of driving a display panel includes: selectively providing a resistance using resistor parts in response to address signals, where the resistor parts have resistances, respectively; and outputting common voltages to the display panel based on the selectively provided resistance.

In an exemplary embodiment, the selectively providing the resistance may include sequentially providing the resistances from the resistors parts.

In an exemplary embodiment, the method of driving a display panel may further include storing resistance data corresponding to the resistances of the resistor parts, respectively, to memories.

In an exemplary embodiment, the method of driving a display panel may further include selectively activating a write protection signal applied to the memories.

In an exemplary embodiment, the selectively activating the write protection signals applied to the memories may include activating a write protection signal of the write protection signals when the write protection signal is applied to a memory connected to a resistor part selected to provide the resistance.

In an exemplary embodiment, the resistances may be digital resistances.

In an exemplary embodiment, the method of driving a display panel may further include converting the digital resistances to analog resistances.

In an exemplary embodiment, the method of driving a display panel may further include receiving address data corresponding to the address signals through an inter-integrated circuit communication.

According to another exemplary embodiment of the invention, a display panel driving apparatus includes a plurality of resistor parts configured to selectively provide a resistance in response to address signals, where the resistor parts have resistances, respectively, and common voltage outputting parts configured to output common voltages to a display panel based on the selectively provided resistance.

In an exemplary embodiment, the resistor parts may sequentially provide the resistances thereof.

In an exemplary embodiment, the display panel driving apparatus may further include memories configured to store resistance data corresponding to the resistances of the resistor parts, respectively.

In an exemplary embodiment, the number of the memories may be the same as the number of the resistor parts.

In an exemplary embodiment, the display panel driving apparatus may further include an input/output expander configured to apply the address signals to the resistor parts.

In an exemplary embodiment, the input/output expander may apply write protection signals to the memories.

In an exemplary embodiment, a write protection signal applied to a memory may be activated when a resistor part connected to the memory is selected to provide a resistance.

In an exemplary embodiment, the resistances may be digital resistances, and the display panel driving apparatus may further include digital-analog converting parts configured to convert the digital resistances to analog resistances.

In an exemplary embodiment, the number of the digital-analog converting parts may be the same as the number of the resistor parts.

In an exemplary embodiment, each of the common voltage outputting parts may include an amplifier, and the amplifier may include: a non-inverting terminal connected to a corresponding analog resistance of the analog resistances; an output terminal which outputs a corresponding common voltage of the common voltages; an inverting terminal connected to the output terminal; a power terminal which receives a power voltage; and a ground terminal which receives a ground voltage.

In an exemplary embodiment, the number of the common voltage outputting parts may be the same as the number of the resistor parts.

According to still another exemplary embodiment of the invention, a display apparatus includes a display panel including a gate line and a data line and which displays an image; and a display panel driving apparatus including: a gate driving part configured to output a gate signal to the gate line; a data driving part configured to output a data signal to the data line; a plurality of resistor parts configured to selectively provide a resistance in response to address signals; and a plurality of common voltage outputting parts configured to output common voltages to the display panel based on the selectively provided resistance, where the resistor parts have resistances, respectively.

According to exemplary embodiments of the invention, resistance data for respectively controlling resistances of resistor parts, based on which common voltages are generated, are stored in memories and the resistance data may be freely changed, such that the common voltages may be effectively controlled.

In such embodiments, the resistor parts respectively include digital variable resistors, and thus accuracy of the common voltages may be improved.

In such embodiments, the resistor parts are driven in response to address signals, and thus the common voltages are selectively outputted.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
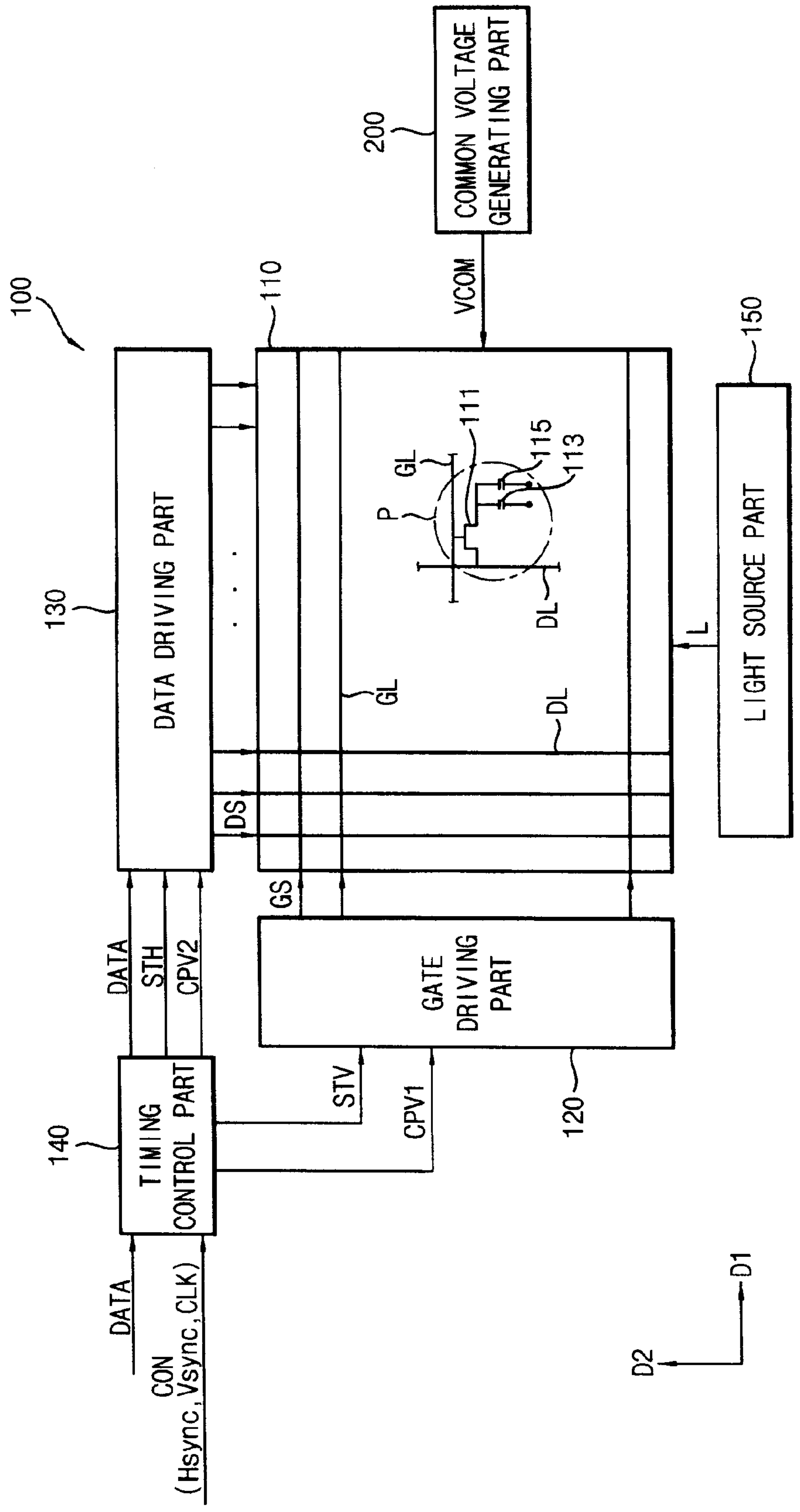
FIG. 1 is a block diagram illustrating an exemplary embodiment of a display apparatus according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in detail with reference to the accompanying drawings.

FIG. 1 is a block diagram illustrating an exemplary embodiment of a display apparatus according to the invention.

Referring to FIG. 1, an exemplary embodiment of the display apparatus 100 includes a display panel 110, a gate driving part 120, a data driving part 130, a timing control part 140, a light source part 150 and a common voltage generating part 200.

The display penal 110 receives a data signal DS based on an image data DATA to display an image. In one exemplary embodiment, for example, the image data DATA may be two-dimensional image data. In an alternative exemplary embodiment, the image data DATA may be three-dimensional image data including a left-eye image data and a right-eye image data for displaying a three-dimensional stereoscopic image.

The display panel 110 includes a plurality of gate lines GL, a plurality of data lines DL and a plurality of pixels P. The gate line GL extends substantially in a first direction D1, and the data line DL extends substantially in a second direction D2, which is substantially perpendicular to the first direction D1. In one exemplary embodiment, for example, the first direction D1 may be parallel with a long side of the display panel 110, and the second direction D2 may be parallel with a short side of the display panel 110. Each of the pixels P includes a thin-film transistor 111 electrically connected to a corresponding gate line of the gate lines GL and a corresponding data line of the data lines DL, a liquid crystal capacitor 113 and a storage capacitor 115 connected to the thin-film transistor 111.

The gate driving part 120 generates a gate signal GS in response to a gate start signal STV and a gate clock signal CPV1 provided from the timing control part 140, and provides the gate signal GS to the gate line GL.

The data driving part 130 provides the data signal DS based on the image data DATA to the data line DL, in response to a data start signal STH and a data clock signal CPV2 provided from the timing control part 140.

The timing control part 140 receives the image data DATA and a control signal CON from an outside. The control signal CON may include a horizontal synchronous signal Hsync, a vertical synchronous signal Vsync and a clock signal CLK. In an exemplary embodiment, the timing control part 140 generates the data start signal STH using the horizontal synchronous signal Hsync, and provides the data start signal STH to the data driving part 130. In such an embodiment, the timing control part 140 generates the gate start signal STV using the vertical synchronous signal Vsync and provides the gate start signal STV to the gate driving part 130. In such an embodiment, the timing control part 140 generates the gate clock signal CPV1 and the data clock signal CPV2 using the clock signal CLK, provides the gate clock signal CPV1 to the gate driving part 120, and provides the data clock signal CPV2 to the data driving part 130.

The light source part 150 provides light L to the display panel 110. In one exemplary embodiment, for example, the light source part 150 may include a light emitting diode ("LED").

The common voltage generating part 200 generates a common voltage VCOM and provides the common voltage VCOM to the display panel 100. The common voltage generating part 200 may be disposed in a voltage supplying part for supplying voltages to the gate driving part 120, the data driving part 130 and the display panel 110.

The gate driving part 120, the data driving part 130, the timing control part 140 and the common voltage generating part 200 may be defined as a display panel driving apparatus driving the display panel 110.

Figure 2:
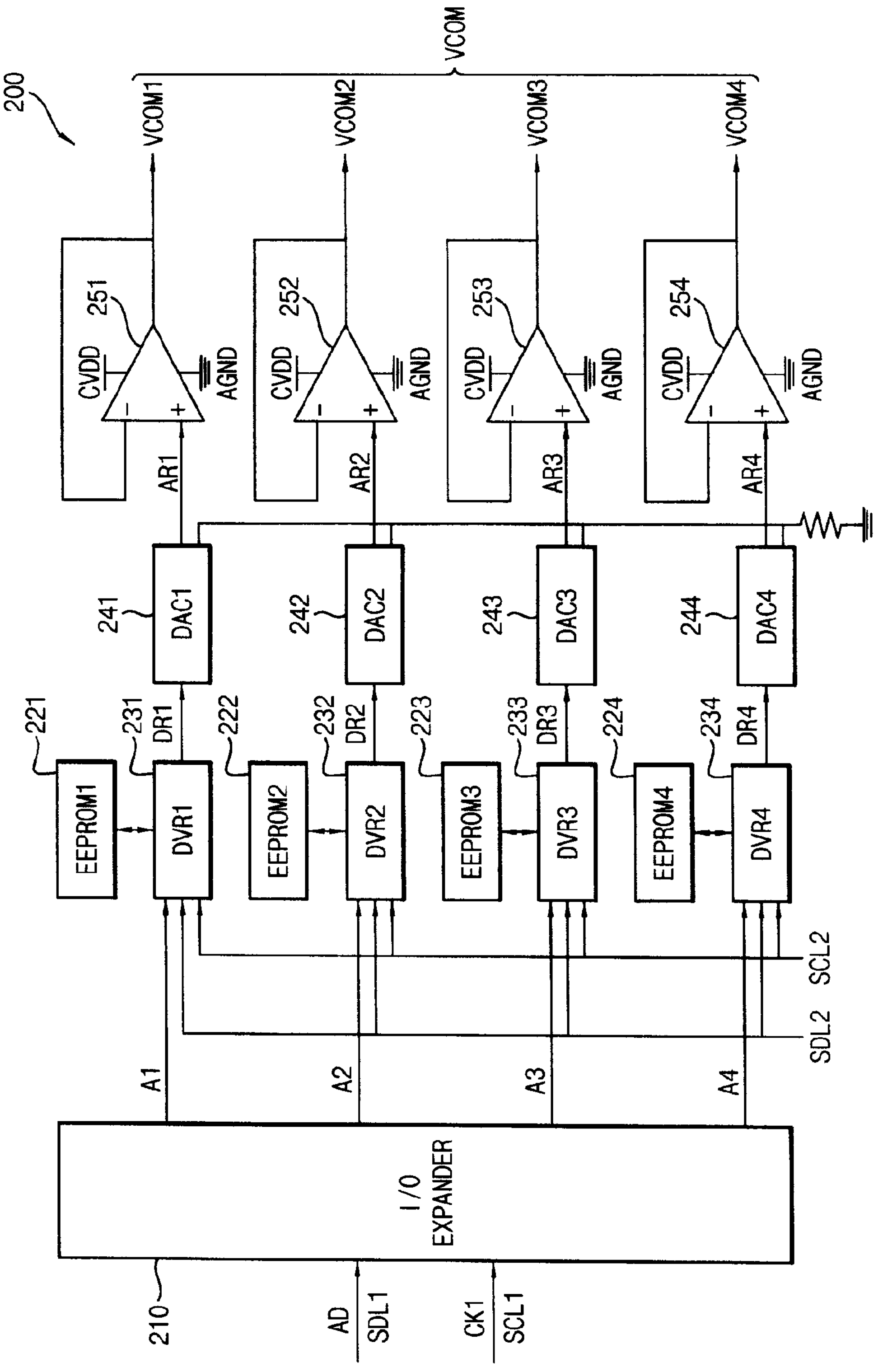
FIG. 2 is a block diagram illustrating an exemplary embodiment of a common voltage generating part of FIG. 1.

FIG. 2 is a block diagram illustrating an exemplary embodiment of the common voltage generating part 200 of FIG. 1.

Referring to FIGS. 1 and 2, the common voltage generating part 200 includes a input/output expander 210 (referred to as an "I/O expander" in FIG. 2), memories 221, 222, 223 and 224, resistor parts 231, 232, 233 and 234, digital-analog converting parts 241, 242, 243 and 244 (referred to as DAC1, DAC2, DAC3 and DAC4 in FIG. 2), and common voltage outputting parts 251, 252, 253 and 254. A number of the memories 221, 222, 223 and 224, a number of the resistor parts 231, 232, 233 and 234, a number of the digital-analog converting parts 241, 242, 243 and 244 and a number of the common voltage outputting parts 251, 252, 253 and 254 may be the same as each other. In one exemplary embodiment, for example, each of the number of the memories 221, 222, 223 and 224, the number of the resistor parts 231, 232, 233 and 234, the number of the digital-analog converting parts 241, 242, 243 and 244 and the number of the common voltage outputting parts 251, 252, 253 and 254 may be four.

The input/output expander 210 receives an address data AD from an outside such as a flick control part. In an exemplary embodiment, the input/output expander 210 may receive the address data AD through an inter-integrated circuit ("I2C") communication. In such an embodiment, the input/output expander 210 may receive the address data AD through a first serial data line SDL1 and may receive a first clock signal CK1 through a first serial clock line SCL1.

In an exemplary embodiment, the input/output expander 210 respectively provides, e.g., outputs, address signals A1, A2, A3 and A4 for selectively driving one of the resistors parts 231, 232, 233 and 234 to the resistors parts 231, 232, 233 and 234 based on the address data AD. In such an embodiment, the input/output expander 210 applies the address signals A1, A2, A3 and A4 to the resistors parts 231, 232, 233 and 234 several times according to the number of the resistors parts 231, 232, 233 and 234 to sequentially drive the resistors parts 231, 232, 233 and 234. In an exemplary embodiment, where the number of the resistors parts 231, 232, 233 and 234 is four as shown in FIG. 2, the input/output expander 210 applies the address signals A1, A2, A3 and A4 to the resistors parts 231, 232, 233 and 234 four times to sequentially drive the resistors parts 231, 232, 233 and 234.

The memories 221, 222, 223 and 224 are respectively connected to the resistors parts 231, 232, 233 and 234 and store resistance data for respectively controlling resistances of the resistors parts 231, 232, 233 and 234. In one exemplary embodiment, for example, each of the memories 221, 222, 223 and 224 may be an electrically erasable and programmable read-only memory ("EEPROM"). In such an embodiment, when the resistance data are changed, the resistances of the resistors parts 231, 232, 233 and 234 may be changed.

The resistors parts 231, 232, 233 and 234 are respectively connected to the memories 221, 222, 223 and 224 and have the resistances corresponding to the resistance data stored in the memories 221, 222, 223 and 224. In an exemplary embodiment, the resistors parts 231, 232, 233 and 234 may be digital variable resistors (referred to as DVR1, DVR2, DVR3 and DVR4 in FIG. 2), and the resistors parts 231, 232, 233 and 234 provide, e.g., output, digital resistances DR1, DR2, DR3 and DR4 to the common voltage outputting parts 251, 252, 253 and 254 based on the resistance data stored in the memories 221, 222, 223 and 224. The digital resistances DR1, DR2, DR3 and DR4 may be different from each other.

In such an embodiment, the resistors parts 231, 232, 233 and 234 selectively provide resistances to the common voltage outputting parts 251, 252, 253 and 254 in response to the address signals A1, A2, A3 and A4 outputted from the input/output expander 210. In one exemplary embodiment, for example, the resistors parts 231, 232, 233 and 234 are selectively driven in response to the address signals A1, A2, A3 and A4, and the selectively driven one of the resistors parts 231, 232, 233 and 234 provides the resistance to a corresponding voltage outputting part of the common voltage outputting parts 251, 252, 253 and 254. In one exemplary embodiment, for example, one of the resistors parts 231, 232, 233 and 234 may be driven in response to an address signal having a low level among the address signals A1, A2, A3 and A4.

In an exemplary embodiment, the resistors parts 231, 232, 233 and 234 are sequentially driven, and receive the address signals A1, A2, A3 and A4 from the input/output expander 210 based on the number of the resistors parts 231, 232, 233 and 234 to be sequentially driven. In an exemplary embodiment, where the number of the resistors parts 231, 232, 233 and 234 is four as shown in FIG. 2 the resistors parts 231, 232, 233 and 234 receives the address signals A1, A2, A3 and A4 from the input/output expander 210 four times.

In an exemplary embodiment, each of the resistors parts 231, 232, 233 and 234 may have an address of 'I' bit (I is a natural number). In such an embodiment, the address signals A1, A2, A3 and A4 may be applied to I-th bit, for example. In an alternative exemplary embodiment, the address signals A1, A2, A3 and A4 may be applied (I−1)-th bit.

The following Table 1 shows an exemplary embodiment of the address signals A1, A2, A3 and A4 when the resistors parts 231, 232, 233 and 234 are sequentially driven.

TABLE 1

| | A1 | A2 | A3 | A4 |
|---|---|---|---|---|
| Only DVR1(231) is driven | 0 | 1 | 1 | 1 |
| Only DVR2(232) is driven | 1 | 0 | 1 | 1 |
| Only DVR3(233) is driven | 1 | 1 | 0 | 1 |
| Only DVR4(234) is driven | 1 | 1 | 1 | 0 |

Referring to Table 1, when the address signals A1, A2, A3 and A4 are '0111', only first resistor part 231 may be driven and only first digital resistance DR1 may be outputted. When the address signals A1, A2, A3 and A4 are '1011', only second resistor part 232 may be driven and only second digital resistance DR2 may be outputted. When the address signals A1, A2, A3 and A4 are '1101', only third resistor part 233 may be driven and only third digital resistance DR3 may be outputted. When the address signals A1, A2, A3 and A4 are '1110', only fourth resistor part 234 may be driven and only fourth digital resistance DR4 may be outputted. In such an embodiment, the resistors parts 231, 232, 233 and 234 are sequentially driven, and the digital resistances DR1, DR2, DR3 and DR4 are thereby sequentially outputted.

In an exemplary embodiment, the first resistor part 231, the second resistor part 232, the third resistor part 233 and the fourth resistor part 234 are sequentially driven based on the address signals A1, A2, A3 and A4, but the invention is not limited thereto. In an alternative embodiment, a driving sequence of the first resistor part 231, the second resistor part 232, the third resistor part 233 and the fourth resistor part 234 may be variously modified.

In an exemplary embodiment, as shown in FIG. 2, each of the resistors parts 231, 232, 233 and 234 is driven when a corresponding address signal of the address signals A1, A2, A3 and A4 has the low level, but the invention is not limited thereto. In an alternative exemplary embodiment, each of the resistors parts 231, 232, 233 and 234 may be driven when the corresponding address signal of the address signals A1, A2, A3 and A4 has a high level, for example.

Each of the resistors parts 231, 232, 233 and 234 may receive data for an operation thereof from an outside through the I2C communication through a second serial data line SDL2 and a second serial clock line SCL2 connected to each of the resistors parts 231, 232, 233 and 234.

The digital-analog converting parts 241, 242, 243 and 244 respectively convert the digital resistances DR1, DR2, DR3 and DR4 outputted from the resistors parts 231, 232, 233 and 234 to analog resistances AR1, AR2, AR3 and AR4. The digital-analog converting parts 241, 242, 243 and 244 may sequentially convert the digital resistances DR1, DR2, DR3 and DR4 based on the address signals A1, A2, A3 and A4 outputted to the resistors parts 231, 232, 233 and 234 to sequentially provide the analog resistances AR1, AR2, AR3 and AR4 to the common voltage outputting parts 251, 252, 253 and 254.

The common voltage outputting parts 251, 252, 253 and 254 respectively output common voltages VCOM1, VCOM2, VCOM3 and VCOM4 based on the analog resistances AR1, AR2, AR3 and AR4 provided from the digital-analog converting parts 241, 242, 243 and 244. The common voltages VCOM1, VCOM2, VCOM3 and VCOM4 respectively outputted from the common voltage outputting parts 251, 252, 253 and 254 may be the common voltage VCOM applied to the display panel 110. The common voltages VCOM1, VCOM2, VCOM3 and VCOM4 may have different voltages corresponding to the resistances respectively outputted from the resistors parts 231, 232, 233 and 234. In such an embodiment, the common voltage outputting parts 251, 252, 253 and 254 may sequentially output the common voltages VCOM1, VCOM2, VCOM3 and VCOM4 based on the address signals A1, A2, A3 and A4 outputted to the resistors parts 231, 232, 233 and 234.

Each of the common voltage outputting parts 251, 252, 253 and 254 may include an amplifier. The amplifier may include a non-inverting terminal, an inverting terminal, an output terminal, a power terminal and a ground terminal.

In one exemplary embodiment, for example, a first common voltage outputting part 251 includes a non-inverting terminal connected to a first analog resistance AR1, an output terminal that outputs a first common voltage VCOM1, an inverting terminal electrically connected to the output terminal, a power terminal that receives a power voltage CVDD and a ground terminal that receives a ground voltage AGND. A second common voltage outputting part 252 includes a non-inverting terminal connected to a second analog resistance AR2, an output terminal that outputs a second common voltage VCOM2, an inverting terminal electrically connected to the output terminal, a power terminal that receives the power voltage CVDD and a ground terminal that receives the ground voltage AGND. The third common voltage outputting part 253 includes a non-inverting terminal connected to a third analog resistance AR3, an output terminal that outputs a third common voltage VCOM3, an inverting terminal electrically connected to the output terminal, a power terminal that receives the power voltage CVDD and a ground terminal receiving the ground voltage AGND. The fourth common voltage outputting part 254 includes a non-inverting terminal that receives a fourth analog resistance AR4, an output terminal that outputs a fourth common voltage VCOM4, an inverting terminal electrically connected to the output terminal, a power terminal that receives the power voltage CVDD and a ground terminal that receives the ground voltage AGND. The fifth common voltage outputting part 255 includes a non-inverting terminal connected to a fifth analog resistance AR5, an output terminal that outputs a fifth common voltage VCOM5, an inverting terminal electrically connected to the output terminal, a power terminal that receives the power voltage CVDD and a ground terminal that receives the ground voltage AGND.

Figure 3:
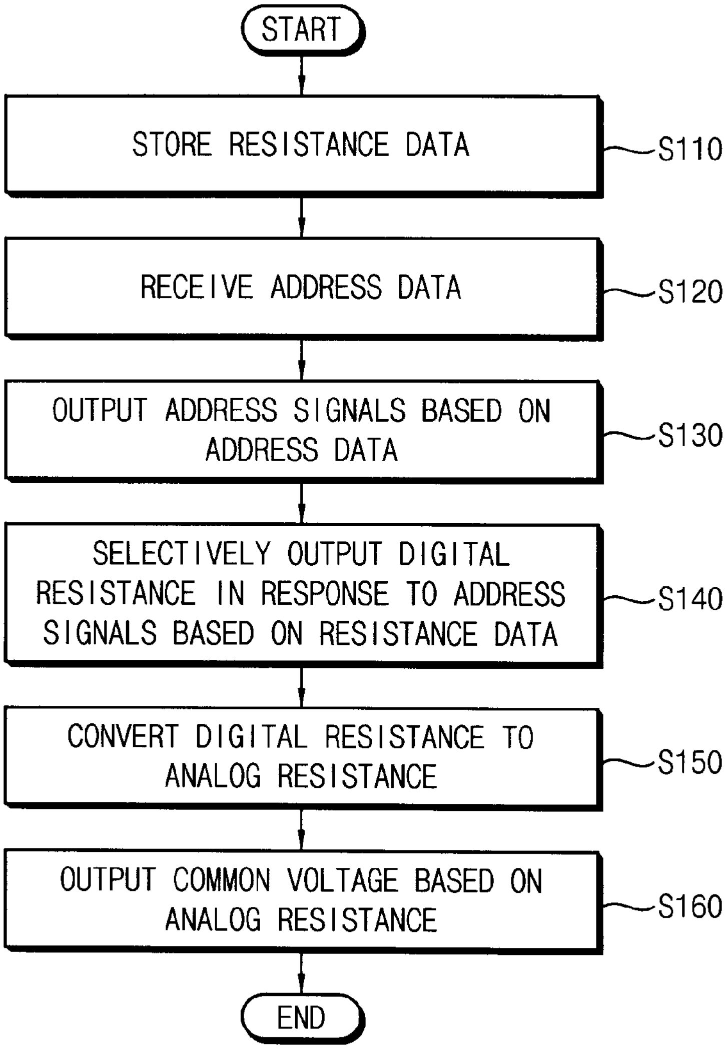
FIG. 3 is a flow chart illustrating an exemplary embodiment of a method of driving a display panel performed by a display panel driving apparatus including the common voltage generating part of FIGS. 1 and 2.

FIG. 3 is a flow chart illustrating an exemplary embodiment of a method of driving a display panel performed by the display panel driving apparatus including the common voltage generating part 200 of FIGS. 1 and 2.

Referring to FIGS. 1 to 3, the resistance data are stored (S110). In one exemplary embodiment, for example, the memories 221, 222, 223 and 224 may store the resistance data for controlling the resistances of the resistors parts 231, 232, 233 and 234, respectively. The resistance data respectively stored in the memories 221, 222, 223 and 224 may be different from each other.

The address data AD is received (S120). In one exemplary embodiment, for example, the input/output expander 210 may receive the address data AD from the outside such as the flicker control part. The input/output expander 210 may receive the address data AD through the I2C communication.

The address signals A1, A2, A3 and A4 are generated based on the address data AD (S130). In one exemplary embodiment, for example, the input/output expander 210 outputs the address signals A1, A2, A3 and A4 for selectively driving the resistors parts 231, 232, 233 and 234 to the resistors parts 231, 232, 233 and 234 based on the address data AD. In such an embodiment, the input/output expander 210 applies the address signals A1, A2, A3 and A4 to the resistors parts 231, 232, 233 and 234 several times corresponding to the number of the resistors parts 231, 232, 233 and 234 to sequentially drive the resistors parts 231, 232, 233 and 234.

The digital resistances DR1, DR2, DR3 and DR4 are outputted to the resistors parts 231, 232, 233 and 234 in response to the address signals A1, A2, A3 and A4 based on the resistance data (S140). In one exemplary embodiment, for example, the resistors parts 231, 232, 233 and 234 are selectively driven in response to the address signals A1, A2, A3 and A4, and one of the resistors parts 231, 232, 233 and 234 driven by a corresponding resistor part in response to the address signals A1, A2, A3 and A4 outputs the resistance. In such an embodiment, the resistors parts 231, 232, 233 and 234 are sequentially driven in response to the address signals A1, A2, A3 and A4. In an exemplary embodiment, the resistors parts 231, 232, 233 and 234 may be the digital variable resistors, and thus the resistors parts 231, 232, 233 and 234 may output the digital resistances DR1, DR2, DR3 and DR4 corresponding to the resistance data stored in the memories 221, 222, 223 and 224.

The digital resistances DR1, DR2, DR3 and DR4 are converted to the analog resistances AR1, AR2, AR3 and AR4 (S150). In one exemplary embodiment, for example, the digital-analog converting parts 241, 242, 243 and 244 respectively convert the digital resistances DR1, DR2, DR3 and DR4 outputted from the resistors parts 231, 232, 233 and 234 into the analog resistances AR1, AR2, AR3 and AR4. The digital resistances DR1, DR2, DR3 and DR4 may be sequentially converted based on the address signals A1, A2, A3 and A4, and the analog resistances AR1, AR2, AR3 and AR4 may be sequentially outputted.

The common voltage VCOM is outputted based on the analog resistances AR1, AR2, AR3 and AR4 provided thereto (S160). In one exemplary embodiment, for example, the common voltage outputting parts 251, 252, 253 and 254 respectively output the common voltages VCOM1, VCOM2, VCOM3 and VCOM4 based on the analog resistances AR1, AR2, AR3 and AR4 provided by the digital-analog converting parts 241, 242, 243 and 244.

In an exemplary embodiment, as shown in FIG. 2, each of the number of the address signals A1, A2, A3 and A4, the number of the memories 221, 222, 223 and 224, the number of the resistor parts 231, 232, 233 and 234, the number of the digital-analog converting parts 241, 242, 243 and 244 and the number of the common voltage outputting parts 251, 252, 253 and 254 is four, but the invention is not limited thereto. In an exemplary embodiment, each of the number of the address signals A1, A2, A3 and A4, the number of the memories 221, 222, 223 and 224, the number of the resistor parts 231, 232, 233 and 234, the number of the digital-analog converting parts 241, 242, 243 and 244 and the number of the common voltage outputting parts 251, 252, 253 and 254 may be N, where N is a natural number.

According to an exemplary embodiment, the resistance data for respectively controlling the resistor parts 231, 232, 233 and 234, based on which the common voltages VCOM1, VCOM2, VCOM3 and VCOM4 are determined, are stored and the resistances are freely changed, and thus the common voltages VCOM1, VCOM2, VCOM3 and VCOM4 may be effectively changed.

In such an embodiment, the resistor parts 231, 232, 233 and 234 respectively include the digital variable resistors, and thus accuracy of the common voltages VCOM1, VCOM2, VCOM3 and VCOM4 may be substantially improved.

In such an embodiment, the resistor parts 231, 232, 233 and 234 are driven in response to the address signals A1, A2, A3 and A4, and thus the voltages VCOM1, VCOM2, VCOM3 and VCOM4 may be selectively outputted.

Figure 4:
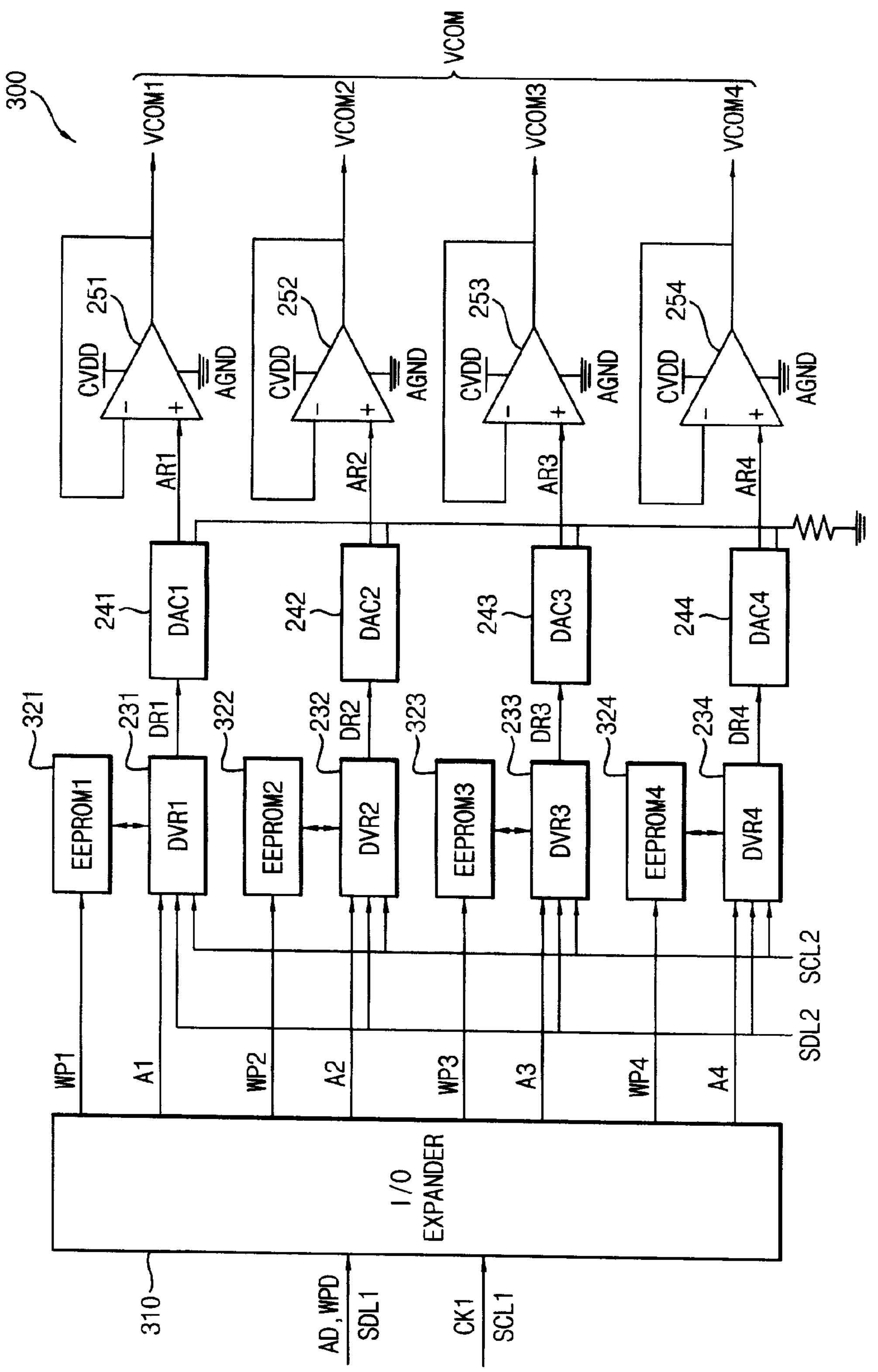
FIG. 4 is a block diagram illustrating an alternative exemplary embodiment of a common voltage generating part according to the invention.

FIG. 4 is a block diagram illustrating an alternative exemplary embodiment of a common voltage generating part according to the invention.

The common voltage generating part 300 shown in FIG. 4 is substantially the same as the common voltage generating part 200 illustrated in FIG. 2 except for an input/output expander 310 and memories 321, 322, 323 and 324. The same or like elements shown in FIG. 4 have been labeled with the same reference characters as used above to describe the exemplary embodiments of the common voltage generating part shown in FIG. 3, and any repetitive detailed description thereof will hereinafter be omitted or simplified.

Referring to FIG. 4, an exemplary embodiment of the common voltage generating part 300 includes the input/output expander 310, the memories 321, 322, 323 and 324, the resistor parts 231, 232, 233 and 234, the digital-analog converting parts 241, 242, 243 and 244, and the common voltage outputting parts 251, 252, 253 and 254. In such an embodiment, a number of the memories 321, 322, 323 and 324, the number of the resistor parts 231, 232, 233 and 234, the number of the digital-analog converting parts 241, 242, 243 and 244 and the number of the common voltage outputting parts 251, 252, 253 and 254 may be the same as each other. In one exemplary embodiment, for example, each of the number of the memories 321, 322, 323 and 324, the number of the resistor parts 231, 232, 233 and 234, the number of the digital-analog converting parts 241, 242, 243 and 244 and the number of the common voltage outputting parts 251, 252, 253 and 254 may be four as shown in FIG. 4.

The input/output expander 310 receives the address data AD from an outside such as a flick control part. In an exemplary embodiment, the input/output expander 310 may receive the address data AD through an I2C communication. In such an embodiment, the input/output expander 310 may receive the address data AD through the first serial data line SDL1 and may receive the first clock signal CK1 through the first serial clock line SCL1.

The input/output expander 310 respectively outputs the address signals A1, A2, A3 and A4 for selectively driving one of the resistors parts 231, 232, 233 and 234 to the resistors parts 231, 232, 233 and 234 based on the address data AD. In such an embodiment, the input/output expander 310 applies the address signals A1, A2, A3 and A4 to the resistors parts 231, 232, 233 and 234 several times corresponding to the number of the resistors parts 231, 232, 233 and 234 to sequentially drive the resistors parts 231, 232, 233 and 234. In an exemplary embodiment, where the number of the resistors parts 231, 232, 233 and 234 is four as shown in FIG. 4, and thus the input/output expander 310 applies the address signals A1, A2, A3 and A4 to the resistors parts 231, 232, 233 and 234 four times.

In an exemplary embodiment, the input/output expander 310 receives a write protection data WPD. In an exemplary embodiment, the input/output expander 310 may receive the write protection data WPD through the I2C communication. In such an embodiment, the input/output expander 310 may receive the write protection data WPD through the first serial data line SDL1. The input/output expander 310 outputs write protection signals WP1, WP2, WP3 and WP4 for protecting a writing of one among the memories 321, 322, 323 and 324 to the memories 321, 322, 323 and 324 based on the write protection data WPD.

The memories 321, 322, 323 and 324 are respectively connected to the resistors parts 231, 232, 233 and 234 and store the resistance data for respectively controlling the resistances of the resistors parts 231, 232, 233 and 234. In one exemplary embodiment, for example, each of the memories 321, 322, 323 and 324 may be an EERPOM. In such an embodiment, the resistance data may be changed such that the resistances of the resistors parts 231, 232, 233 and 234 are changed.

In an exemplary embodiment, the writing of one of the memories 321, 322, 323 and 324 may be protected in response to the write protection signals WP1, WP2, WP3 and WP4 outputted from the input/output expander 310. In such an embodiment, one of the write protection signals WP1, WP2, WP3 and WP4 is activated to protect the writing of the one of the memories 321, 322, 323 and 324.

In an exemplary embodiment, one of the resistors parts 231, 232, 233 and 234 may be driven in response to the address signals A1, A2, A3 and A4, and a writing of a memory connected to the selectively driven resistor part may be protected. In one exemplary embodiment, for example, the writing of the memory among the memories 321, 322, 323 and 324 may be protected in response to one having a high level among the write protection signals WP1, WP2, WP3 and WP4.

In an exemplary embodiment, the writing of the memories 321, 322, 323 and 324 are sequentially protected, and the memories 321, 322, 323 and 324 receive the write protection signals WP1, WP2, WP3 and WP4 from the input/output expander 310 corresponding to the number of the memories 321, 322, 323 and 324. In an exemplary embodiment, where the number of the memories 321, 322, 323 and 324 is four as shown in FIG. 4, the memories 321, 322, 323 and 324 receive the write protection signals WP1, WP2, WP3 and WP4 from the input/output expander 310 four times.

The resistors parts 231, 232, 233 and 234 are respectively connected to the memories 321, 322, 323 and 324 and have the resistances corresponding to the resistance data stored in the memories 321, 322, 323 and 324. In an exemplary embodiment, the resistors parts 231, 232, 233 and 234 may be the digital variable resistors, and the resistors parts 231, 232, 233 and 234 provide the digital resistances DR1, DR2, DR3 and DR4 based on the resistance data stored in the memories 321, 322, 323 and 324 to the digital-analog converting parts 241, 242, 243 and 244.

In an exemplary embodiment, the resistors parts 231, 232, 233 and 234 selectively provide the digital resistances DR1, DR2, DR3 and DR4 to the digital-analog converting parts 241, 242, 243 and 244 in response to the address signals A1, A2, A3 and A4 outputted from the input/output expander 310. In such an embodiment, the resistors parts 231, 232, 233 and 234 are selectively driven in response to the address signals A1, A2, A3 and A4, and selectively driven one of the resistors parts 231, 232, 233 and 234 provides the resistance to a corresponding digital-analog converting part of the digital-analog converting parts 241, 242, 243 and 244.

In an exemplary embodiment, the resistors parts 231, 232, 233 and 234 are sequentially driven, and receive the address signals A1, A2, A3 and A4 from the input/output expander 310 corresponding to the number of the resistors parts 231, 232, 233 and 234 to be sequentially driven. In an exemplary embodiment, where the number of the resistors parts 231, 232, 233 and 234 is four as shown in FIG. 4, and thus the resistors parts 231, 232, 233 and 234 receives the address signals A1, A2, A3 and A4 from the input/output expander 310 four times.

The following Table 2 shows the address signals A1, A2, A3 and A4 and the write protection signals WP1, WP2, WP3 and WP4 when the resistors parts 231, 232, 233 and 234 are sequentially driven.

TABLE 2

| | WP1 | WP2 | WP3 | WP4 | A1 | A2 | A3 | A4 |
|---|---|---|---|---|---|---|---|---|
| Only DVR1(231) is driven | 1 | 0 | 0 | 0 | 0 | 1 | 1 | 1 |
| Only DVR2(232) is driven | 0 | 1 | 0 | 0 | 1 | 0 | 1 | 1 |
| Only DVR3(233) is driven | 0 | 0 | 1 | 0 | 1 | 1 | 0 | 1 |
| Only DVR4(234) is driven | 0 | 0 | 0 | 1 | 1 | 1 | 1 | 0 |

Referring to Table 2, when the address signals A1, A2, A3 and A4 are ‘0111’ and the write protection signals WP1, WP2, WP3 and WP4 are ‘1000’, only the first resistor part 231 may be driven, only the first digital resistance DR1 may be outputted, and a writing of a first memory 321 corresponding to the first resistor part 231 may be protected.

When the address signals A1, A2, A3 and A4 are '1011' and the write protection signals WP1, WP2, WP3 and WP4 are '0100', only the second resistor part 232 may be driven, only the second digital resistance DR2 may be outputted, and a writing of a second memory 322 corresponding to the second resistor part 232 may be protected. When the address signals A1, A2, A3 and A4 are '1101' and the write protection signals WP1, WP2, WP3 and WP4 are '0010', only the third resistor part 233 may be driven, only the third digital resistance DR3 may be outputted, and a writing of a third memory 323 corresponding to the third resistor part 233 may be protected. When the address signals A1, A2, A3 and A4 are '1110' and the write protection signals WP1, WP2, WP3 and WP4 are '0001', only the fourth resistor part 234 may be driven, only the fourth digital resistance DR4 may be outputted, and a writing of a fourth memory 324 corresponding to the fourth resistor part 234 may be protected. Thus, the resistors parts 231, 232, 233 and 234 are sequentially driven, the digital resistances DR1, DR2, DR3 and DR4 are sequentially outputted, and the writings of the memories 321, 322, 323 and 324 are protected correspondingly to the driving of the resistors parts 231, 232, 233 and 234.

In an exemplary embodiment, each of the writings of the memories 321, 322, 323 and 324 are protected a corresponding writes protection signal of the write protection signals WP1, WP2, WP3 and WP4 has a high level, but the invention is not limited thereto. In an alternative exemplary embodiment, each of the writings of the memories 321, 322, 323 and 324 may be protected when the corresponding writes protection signal of the write protection signals WP1, WP2, WP3 and WP4 has a low level.

The digital-analog converting parts 241, 242, 243 and 244 respectively convert the digital resistances DR1, DR2, DR3 and DR4 outputted from the resistors parts 231, 232, 233 and 234 to analog resistances AR1, AR2, AR3 and AR4.

The common voltage outputting parts 251, 252, 253 and 254 respectively output common voltages VCOM1, VCOM2, VCOM3 and VCOM4 based on the analog resistances AR1, AR2, AR3 and AR4 provided by the digital-analog converting parts 241, 242, 243 and 244.

Figure 5:
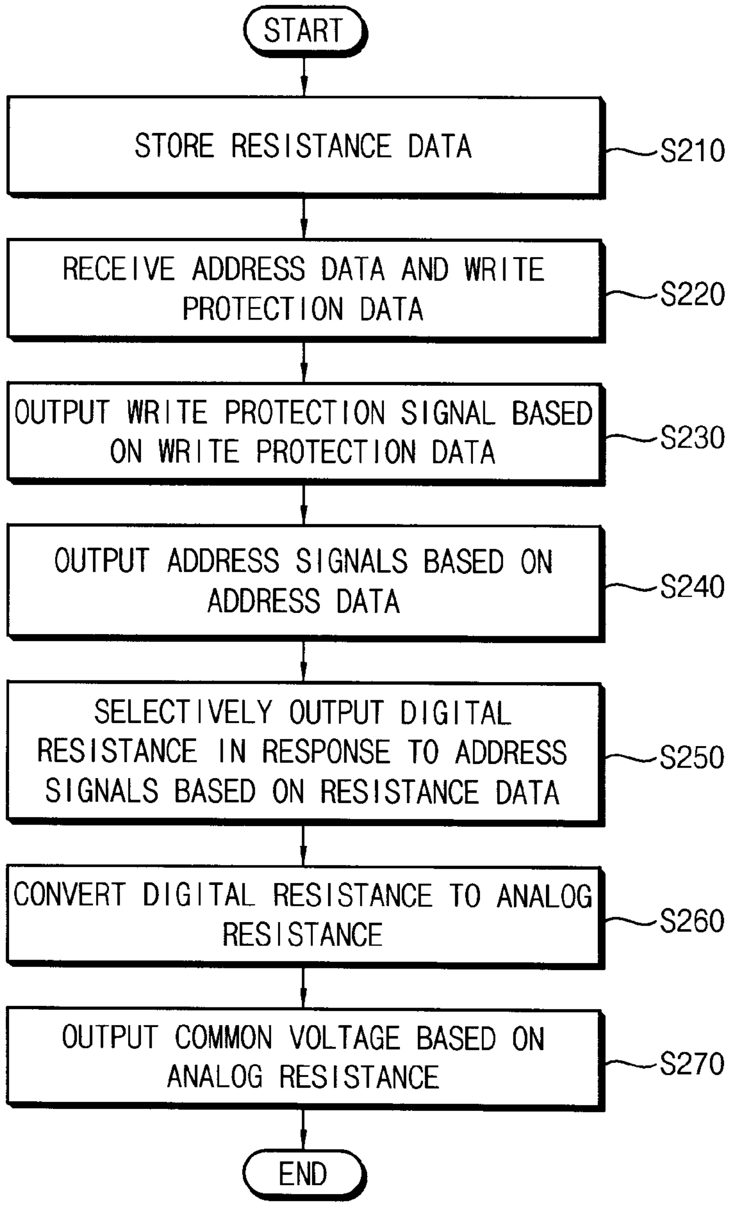
FIG. 5 is a flow chart illustrating an exemplary embodiment of a method of driving a display panel performed by a display panel driving apparatus including the common voltage generating part of FIG. 4.

FIG. 5 is a flow chart illustrating an exemplary embodiment of a method of driving a display panel performed by a display panel driving apparatus including the common voltage generating part 300 of FIG. 4.

Referring to FIGS. 4 and 5, the resistance data are stored (S210). In an exemplary embodiment, the memories 321, 322, 323 and 324 respectively store the resistance data for controlling the resistances of the resistors parts 231, 232, 233 and 234. The resistance data respectively stored in the memories 321, 322, 323 and 324 may be different from each other.

The address data AD and the write protection data WPD are received (S220). In an exemplary embodiment, the input/output expander 310 receives the address data AD and the write protection data WPD from the outside such as the flicker control part. The input/output expander 310 may receive the address data AD and the write protection data WPD through the I2C communication.

The write protection signals WP1, WP2, WP3 and WP4 are outputted based on the write protection data WPD (S230). In an exemplary embodiment, the input/output expander 310 outputs the write protection signals WP1, WP2, WP3 and WP4 for protecting the writing of one among the memories 321, 322, 323 and 324 to the memories 321, 322, 323 and 324 based on the write protection data WPD. In such an embodiment, the input/output expander 310 applies the write protection signals WP1, WP2, WP3 and WP4 corresponding to the memories 321, 322, 323 and 324 to sequentially protect the writings of the 321, 322, 323 and 324.

The address signals A1, A2, A3 and A4 are generated based on the address data AD (S240). In an exemplary embodiment, the input/output expander 310 generates the address signals A1, A2, A3 and A4 for selectively driving the resistors parts 231, 232, 233 and 234 to the resistors parts 231, 232, 233 and 234 based on the address data AD. In such an embodiment, the input/output expander 310 applies the address signals A1, A2, A3 and A4 to the resistors parts 231, 232, 233 and 234 several times corresponding to the number of the resistors parts 231, 232, 233 and 234 to sequentially drive the resistors parts 231, 232, 233 and 234.

The digital resistances DR1, DR2, DR3 and DR4 are outputted in response to the address signals A1, A2, A3 and A4 based on the resistance data (S250). In an exemplary embodiment, the resistors parts 231, 232, 233 and 234 are selectively driven in response to the address signals A1, A2, A3 and A4, and driven one of the resistors parts 231, 232, 233 and 234 generates the resistance corresponding thereto. In such an embodiment, the resistors parts 231, 232, 233 and 234 may be the digital variable resistors, and thus the resistors parts 231, 232, 233 and 234 may output the digital resistances DR1, DR2, DR3 and DR4 to the digital resistances DR1, DR2, DR3 and DR4 based on the resistance data stored in the memories 321, 322, 323 and 324.

The digital resistances DR1, DR2, DR3 and DR4 are converted to the analog resistances AR1, AR2, AR3 and AR4 (S260). In an exemplary embodiment, the digital-analog converting parts 241, 242, 243 and 244 respectively convert the digital resistances DR1, DR2, DR3 and DR4 outputted from the resistors parts 231, 232, 233 and 234 to the analog resistances AR1, AR2, AR3 and AR4. The digital resistances DR1, DR2, DR3 and DR4 may be sequentially converted based on the address signals A1, A2, A3 and A4, and the analog resistances AR1, AR2, AR3 and AR4 may be sequentially provided to the digital resistances DR1, DR2, DR3 and DR4.

The common voltage VCOM is outputted based on the analog resistances AR1, AR2, AR3 and AR4 (S270). In an exemplary embodiment, the common voltage outputting parts 251, 252, 253 and 254 respectively output the common voltages VCOM1, VCOM2, VCOM3 and VCOM4 based on the analog resistances AR1, AR2, AR3 and AR4 provided from the digital-analog converting parts 241, 242, 243 and 244.

In an exemplary embodiment, as shown in FIG. 4, each of the number of the address signals A1, A2, A3 and A4, the number of the write protection signals WP1, WP2, WP3 and WP4, the number of the memories 321, 322, 323 and 324, the number of the resistor parts 231, 232, 233 and 234, the number of the digital-analog converting parts 241, 242, 243 and 244, and the number of the common voltage outputting parts 251, 252, 253 and 254 may be four, but the invention is not limited thereto. In an alternative exemplary embodiment, each of the number of the address signals A1, A2, A3 and A4, the number of the write protection signals WP1, WP2, WP3 and WP4, the number of the memories 321, 322, 323 and 324, the number of the resistor parts 231, 232, 233 and 234, the number of the digital-analog converting parts 241, 242, 243 and 244 and the number of the common voltage outputting parts 251, 252, 253 and 254 may be N, where N is a natural number.

According to an exemplary embodiment, one of the resistors parts 231, 232, 233 and 234 may be driven in response to the address signals A1, A2, A3 and A4, and the writing of the driven resistor part may be protected.

According to an exemplary embodiment of the method of driving the display panel, an exemplary embodiment of the display panel driving apparatus performing the method, and an exemplary embodiment of the display panel including the display panel driving apparatus, resistance data for respectively controlling resistances of resistor parts, based on which the common voltages are generated, are stored in memories and freely changed, and thus a plurality of the common voltages may be variously modified.

In such an embodiment, the resistor parts respectively include digital variable resistors, and thus accuracy of the common voltages may be substantially improved.

In such an embodiment, the resistor parts are driven in response to address signals, and thus the common voltages are selectively outputted.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of driving a display panel, the method comprising:

selectively providing a resistance using resistor parts in response to address signals, wherein the resistor parts have resistances, respectively, wherein the resistances of the resistor parts are digital resistances;

outputting common voltages to the display panel based on the selectively provided resistance; and converting the digital resistances to analog resistances, wherein each of the resistor parts comprises a variable resistor.

2. The method of claim 1, wherein the selectively providing the resistance comprises sequentially providing the resistances from the resistors parts.

3. The method of claim 1, further comprising:

storing resistance data corresponding to the resistances of the resistor parts, respectively, to memories.

4. The method of claim 3, further comprising:

selectively activating write protection signals applied to the memories.

5. The method of claim 4, wherein the selectively activating the write protection signals applied to the memories comprises activating a write protection signal of the write protection signals when the write protection signal is applied to a memory connected to a resistor part selected to provide the resistance.

6. The method of claim 1, further comprising:

receiving address data corresponding to the address signals through an inter-integrated circuit communication.

7. A display panel driving apparatus comprising:

a plurality of resistor parts configured to selectively provide a resistance in response to address signals, wherein the resistor parts have resistances, respectively;

common voltage outputting parts configured to output common voltages to a display panel based on the selectively provided resistance, and an input/output expander configured to apply the address signals to the resistor parts, wherein each of the resistor parts comprises a variable resistor.

8. The display panel driving apparatus of claim 7, wherein the resistor parts sequentially provide the resistances thereof.

9. The display panel driving apparatus of claim 7, further comprising:

memories configured to store resistance data corresponding to the resistances of the resistor parts, respectively.

10. The display panel driving apparatus of claim 9, wherein a number of the memories is the same as a number of the resistor parts.

11. The display panel driving apparatus of claim 7, further comprising:

memories configured to store resistance data corresponding to the resistances of the resistor parts, respectively, wherein the input/output expander applies write protection signals to the memories.

12. The display panel driving apparatus of claim 11, wherein a write protection signal applied to a memory is activated when a resistor part connected to the memory is selected to provide a resistance.

13. The display panel driving apparatus of claim 12, wherein the resistances of the resistor parts are digital resistances, and the display panel driving apparatus further comprises:

digital-analog converting parts configured to convert the digital resistances to analog resistances.

14. The display panel driving apparatus claim 13, wherein a number of the digital-analog converting parts is the same as a number of the resistor parts.

15. The display panel driving apparatus claim 13, wherein each of the common voltage outputting parts comprises an amplifier, and the amplifier comprises:

a non-inverting terminal connected to a corresponding analog resistance of the analog resistances;

an output terminal which outputs a corresponding common voltage of the common voltages;

an inverting terminal connected to the output terminal;

a power terminal which receives a power voltage; and a ground terminal which receives a ground voltage.

16. The display panel driving apparatus claim 7, wherein a number of the common voltage outputting parts is the same as a number of the resistor parts.

17. A display apparatus comprising:

a display panel comprising a gate line and a data line and which displays an image; and a display panel driving apparatus comprising:

a gate driving part configured to output a gate signal to the gate line;

a data driving part configured to output a data signal to the data line;

resistor parts configured to selectively provide a resistance in response to address signals;

common voltage outputting parts configured to output common voltages to the display panel based on the selectively provided resistance; and an input/output expander configured to apply the address signals to the resistor parts, wherein the resistor parts have resistances, respectively, and wherein each of the resistor parts comprises a variable resistor.

* * * * *